United States Patent
Lamay et al.

(10) Patent No.: US 11,062,028 B2
(45) Date of Patent: Jul. 13, 2021

(54) METHODS AND SYSTEMS FOR END-POINT MALWARE PREVENTION TO REFRAIN MALWARE COMPONENTS FROM BEING EXECUTED

(71) Applicant: DECEPTIVE BYTES LTD., Holon (IL)

(72) Inventors: Avi Lamay, Petah Tikva (IL); Hen Lamay, Holon (IL); Sagi Lamay, Holon (IL)

(73) Assignee: DECEPTIVE BYTES LTD., Holon (IL)

( * ) Notice: Subject to any disclaimer, the term of this patent is extended or adjusted under 35 U.S.C. 154(b) by 251 days.

(21) Appl. No.: 16/315,866

(22) PCT Filed: Jul. 5, 2017

(86) PCT No.: PCT/IL2017/050749
§ 371 (c)(1),
(2) Date: Jan. 7, 2019

(87) PCT Pub. No.: WO2018/008024
PCT Pub. Date: Jan. 11, 2018

(65) Prior Publication Data
US 2019/0303574 A1    Oct. 3, 2019

Related U.S. Application Data

(60) Provisional application No. 62/359,230, filed on Jul. 7, 2016.

(51) Int. Cl.
G06F 21/56 (2013.01)
G06F 21/50 (2013.01)
G06F 21/00 (2013.01)

(52) U.S. Cl.
CPC ............ *G06F 21/566* (2013.01); *G06F 21/00* (2013.01); *G06F 21/50* (2013.01); *G06F 21/56* (2013.01);
(Continued)

(58) Field of Classification Search
CPC .... G06F 21/566; G06F 21/564; G06F 21/565; G06F 21/568; G06F 2221/033
(Continued)

(56) References Cited

U.S. PATENT DOCUMENTS 6,330,528 B1 * 12/2001 Huang ................ G06F 9/45537
703/21
H2202 H * 9/2007 Conover ........................ 718/108
(Continued)

FOREIGN PATENT DOCUMENTS

WO    WO 2015/029037 A2    3/2015
WO    WO 2018/008024 A1    1/2018

OTHER PUBLICATIONS

Israel Patent Office, International Preliminary Report on Patentability in International Application No. PCT/IL2017/050749 (dated Nov. 7, 2018).
(Continued)

*Primary Examiner* — Bryan F Wright
(74) *Attorney, Agent, or Firm* — The Roy Gross Law Firm, LLC; Roy Gross

(57) ABSTRACT

The present invention extends to methods, systems, for malware end-point prevention to refrain malware components from being executed, by detecting execution of sequence of programmed instructions within a computer-based environment; subsequently, automatically suspending all execution of the sequence of the programmed instructions within the computer-based environment; injecting a new remote thread into the sequence of the programmed instructions; and executing the injected remote thread as an isolated particle while the execution of the sequence of the programmed instructions within the computer-based environment is still suspended, wherein the injected remote thread is configured to intercept function calls of application program interface (API) within the programmed instructions and dynamically modify the executable.

11 Claims, 3 Drawing Sheets

Figure 1:
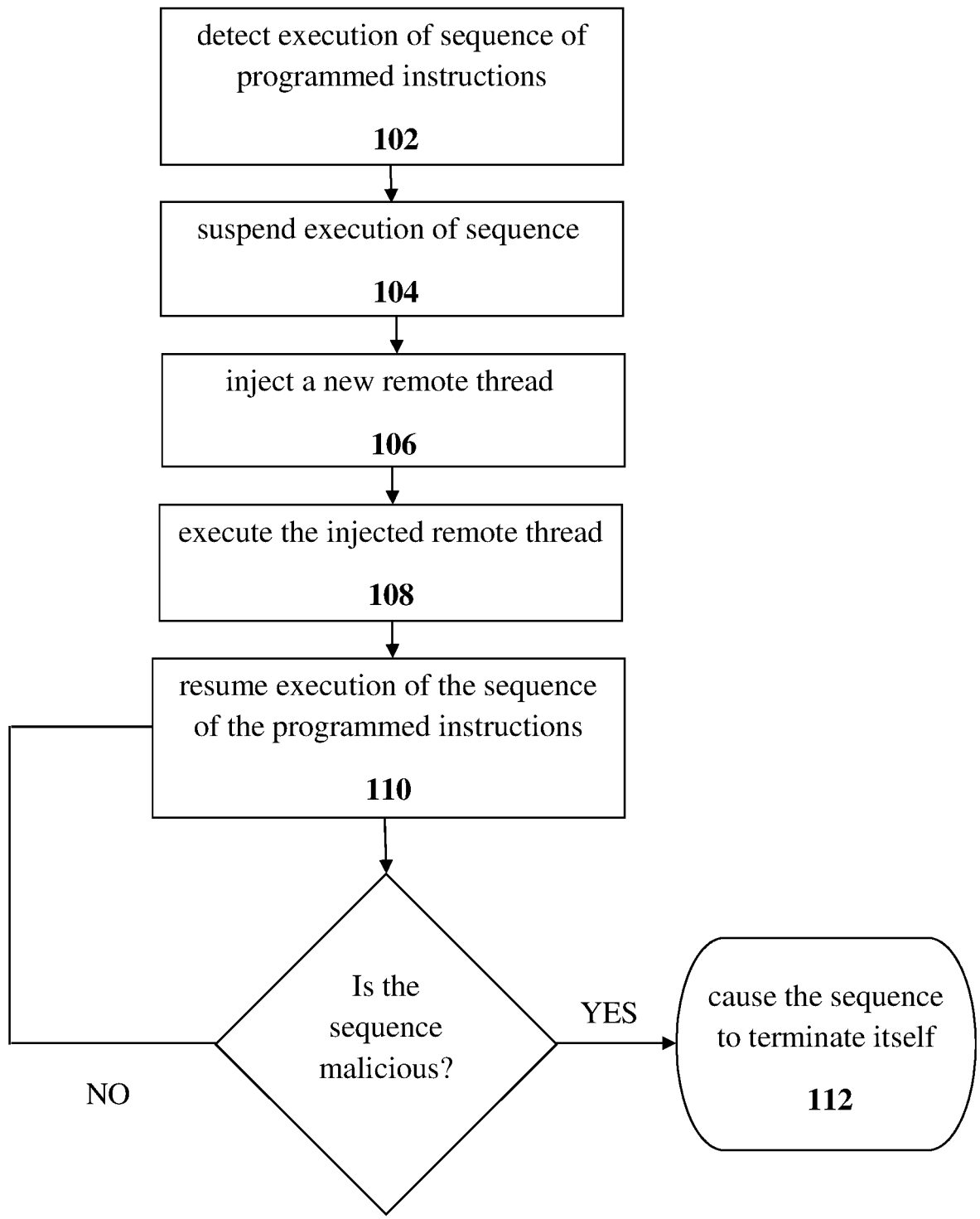

(52) U.S. Cl.
    CPC .......... *G06F 21/564* (2013.01); *G06F 21/565* (2013.01); *G06F 21/568* (2013.01); *G06F 2221/033* (2013.01)

(58) Field of Classification Search
    USPC ........................................................ 726/24
    See application file for complete search history.

(56) References Cited

U.S. PATENT DOCUMENTS

| | | | |
|---|---|---|---|
| 8,127,316 B1* | 2/2012 | Binotto .................. | G06F 21/51 719/331 |
| 8,863,279 B2* | 10/2014 | McDougal .......... | H04L 63/1416 726/22 |
| 9,483,642 B2* | 11/2016 | Kedma .................. | G06F 21/56 |
| 10,089,461 B1* | 10/2018 | Ha .......................... | G06F 21/56 |
| 2006/0031673 A1* | 2/2006 | Beck ..................... | G06F 21/565 713/164 |
| 2008/0016339 A1 | 1/2008 | Shukla | |
| 2008/0178256 A1* | 7/2008 | Perrone .................. | G06F 9/468 726/1 |
| 2012/0167057 A1* | 6/2012 | Schmich ............ | G06F 11/3644 717/130 |

OTHER PUBLICATIONS

Israel Patent Office, International Search Report in International Application No. PCT/IL2017/050749 (dated Sep. 10, 2017).
Israel Patent Office, Written Opinion of the International Search Authority in International Application No. PCT/IL2017/050749 (dated Sep. 10, 2017).

* cited by examiner

METHODS AND SYSTEMS FOR END-POINT MALWARE PREVENTION TO REFRAIN MALWARE COMPONENTS FROM BEING EXECUTED

FIELD OF THE INVENTION

The present invention generally relates to protection of a computer system from malicious activity of malware programs. More particularly, the present invention discloses malware end-point prevention systems and methods that deploy a deceptive executable to refrain malware programs from being executed to facilitate prevention and protection of the system from the malware.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex inter-chaining/specification of ordered-matter elements. The term "ordered-matter elements" may refer to physical components of computation, such as assemblies of electronic logic gates, molecular computing logic constituents, quantum computing mechanisms, etc.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The growth of computer networking has brought with it an explosion in the number of malicious software attacks, commonly referred to as "malware attacks." "Malware," short for malicious software, is software that is designed for hostile or intrusive purposes. For example, malware may be designed with the intent of gathering information, denying or disrupting operations, accessing resources without authorization, or other abusive purposes. Types of malware attacks may include virus attacks, worm attacks, Trojan horse attacks, spyware attacks, adware attacks, botnet attacks, rootkit attacks, ransomware, APT (Advanced Persistent Threats) and denial of service attacks (DDOS). Malware developers typically distribute their software via the Internet, often clandestinely. As Internet use continues to grow around the world, malware developers have more incentives than ever for releasing this software.

One of the ways, malware is often installed on computers running browsers while communicating with malicious web pages that exploit browser vulnerabilities. These malicious web pages may use an "exploit" or "exploit kit" to download and run an executable program of an attacker's choosing on a visitor's computer without any interaction from the user. That is, flaws in either the browser or automatically-launched external programs and extensions can allow a malicious web page to install malware automatically when a user visits the malicious web page, such that the user may not be aware of the installation. Often the web page accessed by a user is an "innocent" web page that has been compromised to reference a malicious web page. Attackers compromise the "innocent" web page in order to drive traffic to their malicious web page, which is used for hosting malicious code, such as malicious executables or browser exploit code. Attackers find ways to inject Hypertext Markup Language ("HTML") and/or JavaScript and/or other web-related technologies code into an innocent web page, which causes the visitor's browser to request and process content from the malicious web page without the visitor's knowledge.

Additionally, malware can also be inserted via infected malicious digital documents in the form of PDF (Portable Document Format) documents, Microsoft Office Word/PowerPoint/Excel documents, etc., which contain malicious scripts or macros to infect the system; spam email containing malicious links or documents, social media posts or links, infected external devices or hard drives, portable disks, CDs, DVDs, Blue-Ray disks, etc.

Malware propagation wastes valuable resources, such as system user time, system administrator resources, network bandwidth, disk space, and central processing unit ("CPU") cycles. Malware can also corrupt data files such that the originals may not be recoverable. Additionally, malware can cause the compromised computer to transmit confidential data (e.g., banking and/or financial information, passwords, digital documents, source code, etc.) to the malware attacker.

Systems and method that are deployed to detect malware programs before entering the host systems are known. U.S. Patent Application No. US 20110225655 A1, Malware protection, discloses a method of protecting a computer system from malware, which malware attempts to prevent detection or analysis when executed in an emulated computer system. The method comprises determining if an executable file should be identified as being legitimate and, if not, executing the executable file whilst providing indications to the executable file that it is being executed within an emulated computer system.

Application WO2015029037 A2, Method and system handling malware discloses systems, methods, and software products prevent malware attacks on networks, which include endpoints, by providing an environment to the endpoint which simulates an environment, for example, a security environment, where malware is known to refrain from executing.

U.S. Pat. No. 8,832,829 B2, Network-based binary file extraction and analysis for malware detection, discloses system and method for network-based file analysis for malware detection. Network content is received from a network tap. A binary packet is identified in the network content. A binary file, including the binary packet, is extracted from the network content. It is determined whether the extracted binary file is detected to be malware.

None of the current technologies and prior art, taken alone or in combination, does not address nor provide a truly integrated solution in a form of a malware end-point prevention systems and methods that deploy a deceptive factor within the original computer environment to refrain malware programs from being executed to facilitate prevention and protection of the system from the malware.

Therefore, there is a long felt and unmet need for a system and method that overcomes the problems associated with the prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

It is thus an object of the present invention to provide a computer-implemented method for malware end-point prevention to refrain malware components from being executed, the method comprising the steps of: detecting execution of sequence of programmed instructions within a computer-based environment; subsequently, automatically suspending all execution of the sequence of the programmed instructions within the computer-based environment; injecting a new remote thread using a dynamic link library (DLL) module into the sequence of the programmed instructions; and executing the injected remote thread as an isolated particle while the execution of the sequence of the programmed instructions within the computer-based environment is still suspended, the injected remote thread is configured to intercept function calls of application program interface (API) within the programmed instructions and dynamically modify the executable.

It is another object of the present invention to provide a computer-implemented system for malware end-point prevention to refrain malware components from being executed, the system comprising: one or more processors; and a memory system communicatively coupled to the one or more processors, the memory system comprises executable instructions including: a detection module to detect execution of sequence of programmed instructions within a computer-based environment; a processing module to, subsequently, automatically suspend all execution of the sequence of the programmed instructions within the computer-based environment; and a dynamic link library (DLL) module to inject a new remote thread into the sequence of the programmed instructions; the processing module is configured to execute the injected remote thread as an isolated particle while the execution of the sequence of the programmed instructions within the computer-based environment is still suspended, and wherein the injected remote thread is configured to intercept function calls of application program interface (API) within the programmed instructions and dynamically modify the executable.

The details of one or more embodiments are set forth in the accompanying drawings and the description below. Other features, objects, and advantages of the invention will be apparent from the description and drawings, and from the claims.

BRIEF DESCRIPTION OF THE PREFERRED EMBODIMENTS

Figure 2:
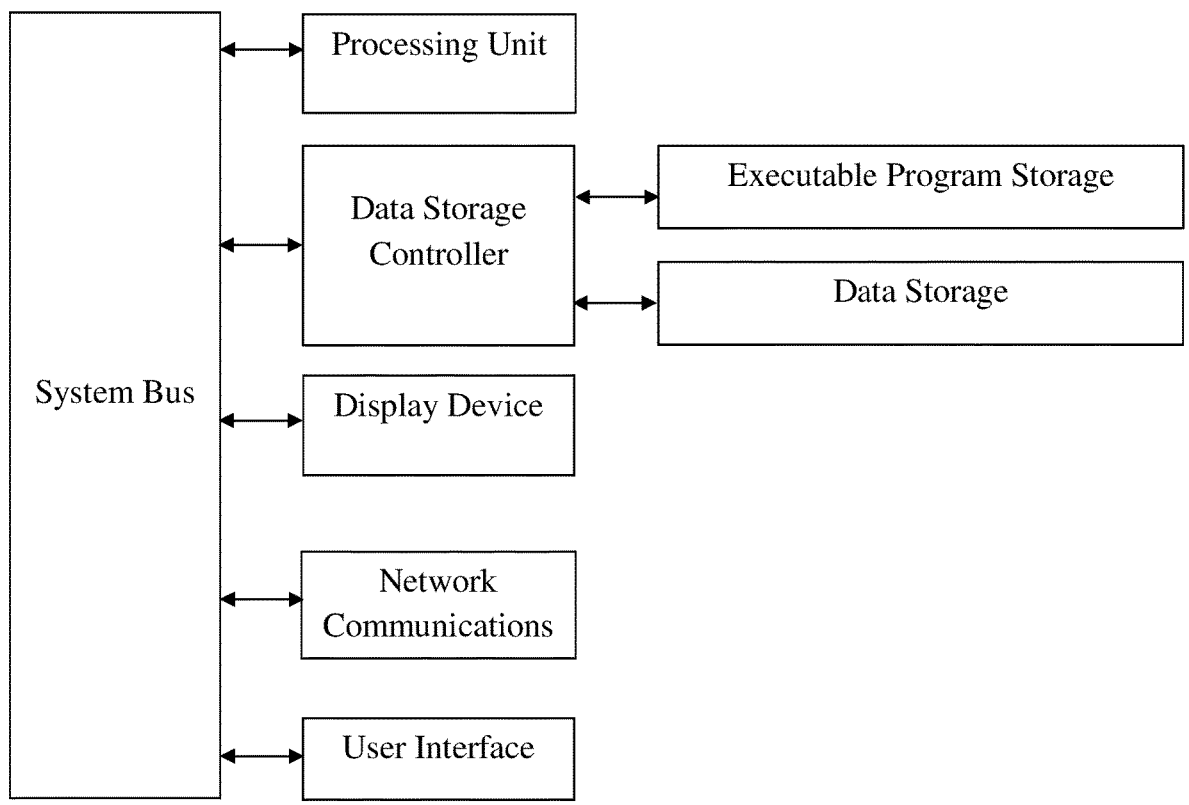
Figure 3:
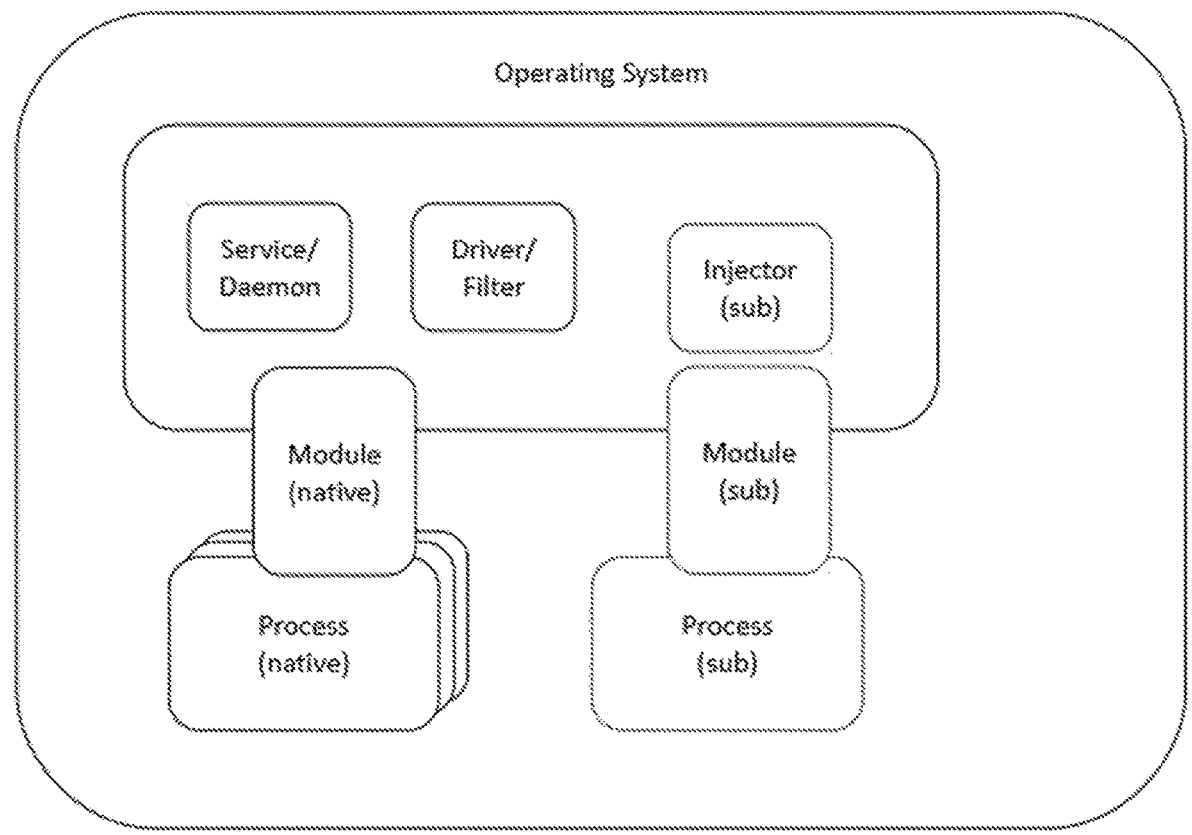

The novel features believed to be characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings. In order to better understand the invention and its implementation in a practice, a plurality of embodiments will now be described, by way of non-limiting example only, with reference to the accompanying drawings, in which FIG. 1 graphically illustrates, according to another preferred embodiment of the present invention, a flow chart, according to another preferred embodiment, of the present invention method for malware end-point prevention to refrain malware components from being executed;

FIG. 2 graphically illustrates, according to another preferred embodiment of the present invention, an example of computerized environment for implementing the invention; and FIG. 3 graphically illustrates, according to another preferred embodiment of the present invention, an example of the present invention system for malware end-point prevention to refrain malware components from being executed.

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "transferring", "detecting," "calculating", "processing", "performing," "identifying," "configuring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

As will be explained in further detail below, the technology described herein relates to malware end-point prevention to refrain malware components from being executed and/or prevent malicious behavior's successful execution from altering or damaging the system and/or prevent the malware's persistence/sustainability within the system. For example, the present invention is directed to systems that prevent malware attacks, by facilitating a deceptive executable within the original sequence. The deceptive executable deploys, for example, data changes in the endpoints of internal networks, and where it is known that the malware will refrain from executing, thus, preventing the malware from damaging the network and the machines thereon based on those data changes. For known malicious behavior (e.g.: injections), manipulating the response will cause the malware to think it was successful to refrain malware components from being executed as a proactive and/or preemptive measurement (offensive defense).

The present invention provides systems, methods, and software solution, which prevent malware attacks on networks, which include endpoints. These systems, methods and software products perform within an original computer-implemented environment of the endpoint. The present invention operates such that when malware reaches internal network endpoints, and the malware determines that the present environment, which is the original system's end-point, the malware refrains from, and does not, execute due to the data modifications in the sequence of programmed instructions within the computer-based environment. Additionally, the present invention prevents malware attacks without having to detect the presence of malware. This is different from contemporary security systems, which actually detect malware by detecting elements of the malware, such as signatures, or by methods such as behavior detection.

The term "end-point device" interchangeably refers, but not limited to computers ("machines" and "computers" are used interchangeably herein) and computing or computer systems (for example, physically separate locations or devices), computer and computerized devices, processors, processing systems, computing cores (for example, shared devices), and similar systems, modules and combinations of the aforementioned, servers in a form of a remote computer or remote computer system, or computer program therein, that is accessible over a communications medium, such as a communications network including the Internet, that provides services to other computer programs (and their users), in the same or other computers. A server may also include a virtual machine, a software based emulation of a computer, and/or hardware based emulation (such as VMWare ESXi servers).

While the invention is susceptible to various modifications and alternative forms, specific embodiments thereof have been shown by way of example in the drawings and the above detailed description. It should be understood, however, that it is not intended to limit the invention to the particular forms disclosed, but on the contrary, the intention is to cover all modifications, equivalents, and alternatives falling within the spirit and scope of the invention as defined by the appended claims.

As a non-limiting example, the method for malware end-point prevention to refrain malware components from being executed can be executed using a computerized process according to the example method 100 illustrated in FIG. 1. As illustrated in FIG. 1, the method 100 can first detect execution of sequence of programmed instructions 102 within a computer-based environment; subsequently, automatically suspend all execution of the sequence of the programmed instructions 104 within the computer-based environment; inject a new remote thread 106 into the sequence of the programmed instructions; and execute the injected remote thread 108 as an isolated particle while the execution of the sequence of the programmed instructions within the computer-based environment is still suspended, wherein the injected remote thread is configured to intercept function calls within the programmed instructions by transferring function calls to the injected remote thread, dynamically modify the executable and return dynamically modified data to the sequence of the programmed instructions within the computer-based environment. Subsequently to the step 108, the method can further resume execution of the sequence of the programmed instructions 110 within the computer-based environment comprising the new injected remote thread. After the step 108, if the sequence of the programmed instructions is malicious, the method causes the sequence of the programmed instructions to terminate itself 112 and refrain malware components from being executed within the computer-based environment by facilitating a deceptive executable in a form of the injected remote thread. The step 108 of executing the injected remote thread as an isolated particle within of the sequence of the programmed instructions within the computer-based environment can be performed on an end-point stand-alone device. The executing of the injected remote thread as an isolated particle within of the sequence of the programmed instructions within the computer-based environment can be performed using physical modification of an executable or library before the programmed instructions are running through techniques of reverse engineering and/or runtime modification by changing code instructions of the target function to move to an injected thread. The physical modification and/or runtime modification can be applied using dynamic library link injection, import address table (IAT) hooking, virtual table (Vtable) patching, MS-Detours, hiding process under an operating system, drivers, filters or any other form of kernel-mode low-level code, export address table (EAT) hooking, system configuration (e.g. Windows' "AppInit_DLLs" registry), change system's API (e.g. Windows API "SetWindowsHookEx" function), context switching or code cave (change code path to execute another code, e.g. using Windows' SetThreadContext function), modifying the executed instructions in memory (e.g. using Windows' "WriteProcessMemory" to insert/modify a process' code), exploiting and/or using OS implementation/limitation (e.g. Windows' DLL search path and LoadLibrary[Ex] functions behavior, or Unix-based environment variables "LD_PRELOAD", "LD_LIBRARY_PATH", etc.), module substitution (replacing original with modified module), OS-level shims, interrupt descriptor table (IDT) hooking, system service descriptor table (SSDT) hooking, custom debugger (attaching custom debugger to control execution) and any combinations thereof.

Reference is made now to FIG. 2 which graphically illustrates, according to another preferred embodiment of the present invention, an example of computerized system for implementing the invention 200. The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), touch-screen; or touch-pad, virtual display, or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as C, C++, Assembly, C #™, JAVA™, Flash™ ActionScript, Visual Basic™, JavaScript™, PHP, Python, XML, HTML, etc. or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as TCP/UDP/ICMP/HTTP/DNS/SOAP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™ Google™ Android™, Unix™/X-Windows™, Windows Mobile™, Windows Phone™, Linux™, etc.

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of environment tracking systems, data representing user events, virtual elements, etc. can be stored in tables in the RDBMS. The tables can have pre-defined relationships between them. The tables can also have adjuncts associated with the coordinates.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Reference is now made to FIG. 3, which is a schematic illustration of an example of the present invention system for malware end-point prevention to refrain malware components from being executed 300 in accordance with one or more embodiments according to one implementation of the technology disclosed. As illustrated in FIG. 3, the system comprises a sub process in a form of sub-system(s) within the system (e.g. WoW64 which supports 32-bit processes on 64-bit Windows OS, etc.).

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A computer-implemented method for malware end-point prevention to cause a sequence of programmed instructions to refrain from executing malware components, the method comprising the steps of:
   detecting execution of a sequence of programmed instructions within a computer-based environment, said sequence comprising malware;
   subsequently, automatically suspending all execution of the sequence of the programmed instructions within the computer-based environment;
   injecting a deceptive executable in the form of a new remote thread into the sequence of the programmed instructions;
   transferring function calls within the programmed instructions to the injected remote thread while the execution of the sequence of the programmed instructions within the computer-based environment is still suspended, wherein the injected remote thread is configured to intercept the function calls and return dynamically modified data to the sequence of the programmed instructions within the computer-based environment; and
   resuming execution of the sequence of programmed instructions within the computer-based environment comprising the new injected remote thread;
   wherein said injected remote thread is further configured to manipulate responses to said function calls, said manipulated responses indicating to said sequence of programmed instructions that said malware was successful, causing said sequence of programmed instructions to terminate itself, thereby causing said malware to refrain execution.

2. The method of claim 1, wherein transferring function calls within the programmed instructions to the injected remote thread is performed on an end-point stand-alone device.

3. The method of claim 1, further comprising a step of using physical modification of an executable or library before the programmed instructions are running through techniques of reverse engineering and/or runtime modification by changing code instructions of the target function to move to an injected thread.

4. The method of claim 3, wherein physical modification and/or runtime modification is applied using dynamic library link injection, import address table (IAT) hooking, virtual table (Vtable) patching, MS-Detours, hiding process under an operating system, drivers, filters or other form of kernel-mode low-level code, export address table (EAT) hooking, change system configuration, change system's application program interface, change code path to execute another code, modifying the executed instructions in memory, exploiting operating system implementation, module substitution, operating system-level shims, interrupt descriptor table (IDT) hooking, system service descriptor table (SSDT) hooking, custom debugger and/or any combinations thereof.

5. A computer-implemented system for malware end-point prevention to cause a sequence of programmed instructions to refrain from executing malware components, the system comprising:
   one or more processors; and
   a memory system communicatively coupled to the one or more processors, the memory system comprises executable instructions including:
      a detection module to detect execution of a sequence of programmed instructions within a computer-based environment, said sequence comprising malware;
      a processing module to, subsequently, automatically suspend all execution of the sequence of the programmed instructions within the computer-based environment; and
      an injection module to inject a deceptive executable in the form of a new remote thread into the sequence of the programmed instructions;
   wherein the processing module is configured to transfer function calls within the programmed instructions to the injected remote thread while the execution of the sequence of the programmed instructions within the computer-based environment is still suspended; and wherein the injected remote thread is configured to intercept the function calls of application program interface (API) within the programmed instructions and return dynamically modified data to the sequence of the programmed instructions within the computer-based environment; and wherein the processing module is further configured to resume execution of the sequence of the programmed instructions within the computer-based environment comprising the new injected remote thread; wherein said injected remote thread is further configured to manipulate responses to said function calls, said manipulated responses indicating to said sequence of programmed instructions that said malware was successful, causing said sequence of programmed instructions to terminate itself, thereby causing said malware to refrain execution.

6. The system of claim 5, wherein the processing module is further configured to return dynamically modified data to the sequence of the programmed instructions within the computer-based environment.

7. The system of claim 5, wherein the processing module is configured to execute the injected remote thread as an isolated particle within of the sequence of the programmed instructions within the computer-based environment on an end-point stand-alone device.

8. The system of claim 5, wherein the processing module is further configured to use physical modification of an executable or library before the programmed instructions are running through techniques of reverse engineering and/or runtime modification by changing code instructions of the target function to move to an injected thread.

9. The system of claim 8, wherein physical modification and/or runtime modification is applied using dynamic library link injection, import address table (IAT) hooking, virtual table (Vtable) patching, MS-Detours, hiding process under an operating system, drivers, filters or other form of kernel-mode low-level code, export address table (EAT) hooking, change system configuration, change system's application program interface, change code path to execute another code, modifying the executed instructions in memory, exploiting operating system implementation, module substitution, operating system-level shims, interrupt descriptor table (IDT) hooking, system service descriptor table (SSDT) hooking, custom debugger, and/or any combinations thereof.

10. The method of claim 1, wherein said malware comprises instructions to download malicious code, said method preventing said download of said malicious code.

11. The system of claim 5, wherein said malware comprises instructions to download malicious code, said system preventing said download of said malicious code.

* * * * *